No. 775,771. Patented November 22, 1904.

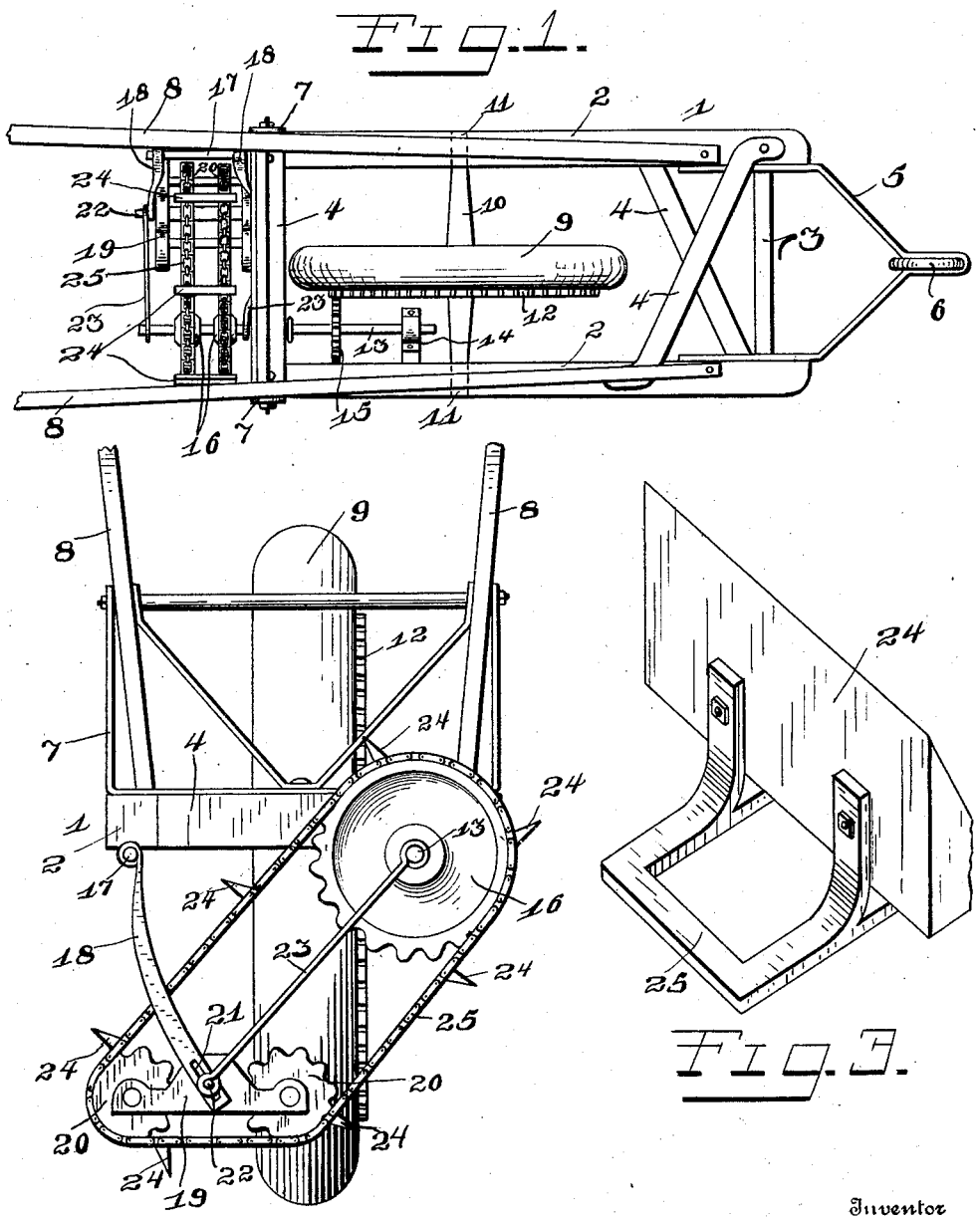

UNITED STATES PATENT OFFICE.

JOHN A. HOGUE, OF PLAINFIELD, ARKANSAS.

COTTON-CHOPPER.

SPECIFICATION forming part of Letters Patent No. 775,771, dated November 22, 1904.

Application filed June 9, 1904. Serial No. 211,827. (No model.)

*To all whom it may concern:*

Be it known that I, JOHN A. HOGUE, a citizen of the United States, residing at Plainfield, in the county of Columbia and State of Arkansas, have invented certain new and useful Improvements in Cotton-Choppers; and I do declare the following to be a full, clear, and exact description of the invention, such as will enable others skilled in the art to which it appertains to make and use the same.

My invention is an improved cotton-chopper adapted for use in chopping out superfluous plants in the cotton-drills and reducing the same to "stands;" and it consists in the construction, combination, and arrangement of devices hereinafter described and claimed.

The object of my invention is to provide a cheap, simple, and efficient machine of this character which may be readily drawn by one horse and controlled by a plowman and which is of maximum capacity.

In the accompanying drawings, Figure 1 is a side elevation of my improved cotton-chopper. Fig. 2 is a top plan view of the same. Fig. 3 is a rear elevation of the same.

The frame 1 is here shown as comprising a pair of side bars 2, connected together at their front and rear ends by cross-bars 3 4, respectively. They are also here shown as connected together at their front ends by a pair of cross brace-bars 4 and by a draft-yoke 5, which has a clevis 6 for the attachment of a swingletree and the vertical adjustment of the swingletree to regulate the draft. At the rear end of the frame is a suitable yoke 7. Handle-bars 8 are secured thereto and their front ends are secured on the side bars 2.

A ground-wheel 9, which is disposed midway between the said bars of the frame, is provided with an axle-shaft 10, which is journaled in bearings 11, with which said side bars are provided. On one side of the ground-wheel is a gear 12, which is here shown as a crown-gear, but which may be of any suitable form. A longitudinal shaft 13 at one side of the frame 1, at the rear end thereof, has its bearings in the rear cross-bar 4 and in a bracket-arm 14, the latter being secured to one of the side bars 2. This shaft has a gear 15, which engages the gear 12, and hence the shaft 13 is rotated at a comparatively high rate of speed by the said gears and the ground-wheel 9 when the machine is in motion. The rear end of the shaft 13 projects rearwardly from the frame 1, and on the same are secured a pair of sprocket-wheels 16, which are appropriately spaced apart. From the opposite side of the frame 1, at the rear end thereof, projects a pivot-bar 17, to which are pivotally connected the upper ends of the arms 18 of the frame 19. The latter is provided with bearings for the shafts of two pairs of sprocket-wheels 20. One pair of the said sprocket-wheels are disposed nearly in line with the ground-wheel 9, and the other pair are in a plane which is to one side of the ground-wheel. The arms 18 have slots 21, and the frame 19, which is slidably connected to the said arms for vertical adjustment thereon, is provided with a bolt-rod 22, which operates in the said slots. Brace-rods 23 have their lower ends secured to the said bolt-rods and their upper ends pivotally mounted on the shaft 13. Thereby the frame 19, which carries the two pairs of sprocket-wheels 20, is adjusted vertically and moves when so adjusted concentrically with reference to the shaft 13.

The chopping-hoes 24 are connected to and operated by a pair of endless sprocket-chains 25, which connect the sprocket-wheels 16 20 and are driven by the frame. A suitable number of the chopping-hoes are employed, and they are suitably spaced apart, and it will be understood that when the machine is in motion the chopping-hoes run transversely with reference to and across the cotton-drills, the machine being moved in line with each drill with its ground-wheel 9 immediately to one side thereof, so that the chopping-hoes are caused to chop out and destroy the superfluous plants in the drills and reduce them to stands suitably spaced apart. By vertically adjusting the frame 19, which carries the sprocket-wheels 20, the chopping-hoes may be caused to run and operate at any required depth across the drills.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A cotton-chopper comprising a frame, the ground-wheel carried thereby, a longitudinally-disposed shaft geared to and rotated by the ground-wheel, sprocket-wheels on said shaft, depending supporting-bars 23 at the rear end of said shaft, arms 18 pivotally connected to and depending from the rear end of the frame, the lower ends of the rods 23 being slidably connected to said arms, a supporting-frame secured between the lower ends of the latter, sprocket-wheels carried by the said supporting-frame, endless sprocket-chains connecting the said sprocket-wheels to those on the longitudinal shaft and chopping-hoes carried by the said endless sprocket-chains, substantially as described.

2. In a cotton-chopper, the combination of a main frame, a longitudinally-disposed shaft having its bearings on the frame, means to revolve said shaft, a sprocket-wheel on said shaft, a transversely-disposed frame, direction-wheels spaced apart and mounted in the transversely-disposed frame for revolution, an endless sprocket-chain driven by the sprocket-wheel on the shaft, engaging the direction-wheels and having chopping-hoes, and means to adjustably support the said transversely-disposed frame and guide the same eccentrically with reference to said shaft, substantially as described.

In testimony whereof I have hereunto set my hand in presence of two subscribing witnesses.

JOHN A. HOGUE.

Witnesses:
J. T. RUNYAN,
T. J. SMITH.